United States Patent [19]

Beaudoin et al.

[11] 4,225,353

[45] Sep. 30, 1980

[54] REINFORCED SULPHUR-ASPHALT COMPOSITES OF TWO CONTINUOUS PHASES

[75] Inventors: James J. Beaudoin; Peter J. Sereda, both of Ottawa, Canada

[73] Assignee: Canadian Patents and Development Limited, Ottawa, Canada

[21] Appl. No.: 899,346

[22] Filed: Apr. 24, 1978

Related U.S. Application Data

[63] Continuation-in-part of Ser. No. 729,362, Oct. 10, 1976, abandoned.

[30] Foreign Application Priority Data

Oct. 15, 1975 [CA] Canada .................................. 237678

[51] Int. Cl.$^3$ .............................................. C08L 95/00
[52] U.S. Cl. .................................. 106/275; 106/274; 260/28.5 R; 260/28.5 AS
[58] Field of Search .............................. 106/274, 275; 260/28.5 R, 28.5 AS

[56] References Cited

U.S. PATENT DOCUMENTS

| | | | |
|---|---|---|---|
| 3,738,853 | 6/1973 | Kopvillem et al. ................... | 106/275 |
| 3,970,468 | 7/1976 | Garrigues .............................. | 106/274 |
| 3,997,355 | 12/1976 | Santucci et al. ...................... | 106/274 |
| 4,135,022 | 1/1979 | Kennepohl et al. ................. | 106/274 |

FOREIGN PATENT DOCUMENTS

| | | | |
|---|---|---|---|
| 1042610 | 11/1978 | Canada ..................................... | 106/274 |
| 2551929 | 6/1976 | Fed. Rep. of Germany ........... | 106/274 |
| 1444629 | 5/1966 | France . | |
| 1057973 | 2/1967 | United Kingdom ..................... | 106/274 |
| 1076866 | 7/1967 | United Kingdom ..................... | 106/274 |
| 1363706 | 8/1974 | United Kingdom ..................... | 106/274 |

*Primary Examiner*—Murray Tillman
*Assistant Examiner*—Arthur H. Koeckert
*Attorney, Agent, or Firm*—Richard J. Hicks; Stanley E. Johnson

[57] ABSTRACT

A sulfur-bituminous composite binder material consisting essentially of 60–75% by weight sulfur and 25–40% by weight bituminous material. Optionally a small amount of a fibrous or flake reinforcing material and usually a filler material can be added. The binder is suitable for use as a self-compacting road or pothole repair material. A feature of the composite binder is the presence of two continuous phases which is achieved by mixing solid particulate sulfur with a softened bituminous material at a temperature in the range 120°–150° C. or by mixing liquid sulfur with liquid asphalt with a sufficient shearing mixing action to produce an emulsion of the liquid sulfur in the asphalt which, on cooling produces a continuous, rigid, crystaline and porous sulfur skeleton in the composite.

17 Claims, 7 Drawing Figures

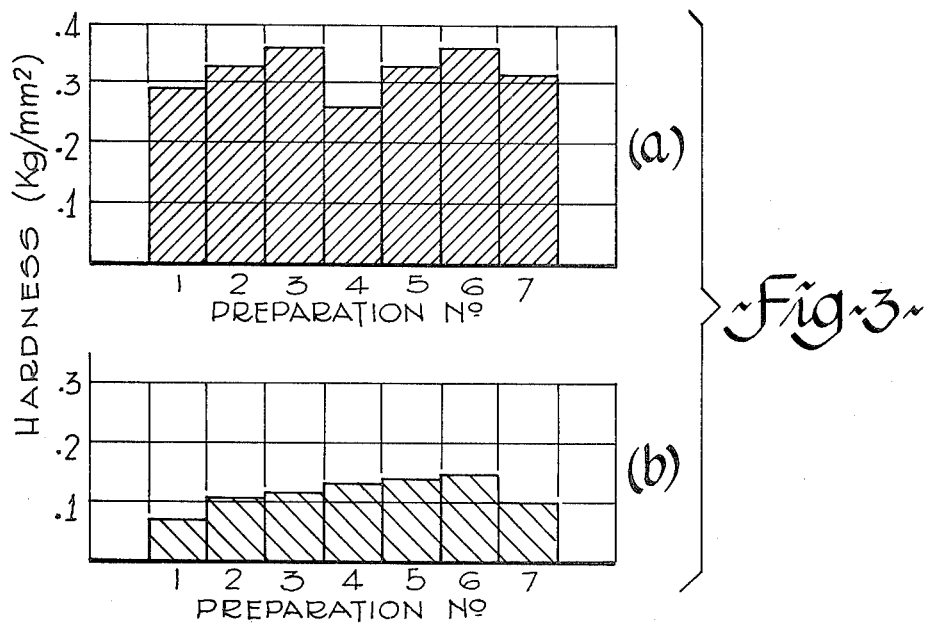
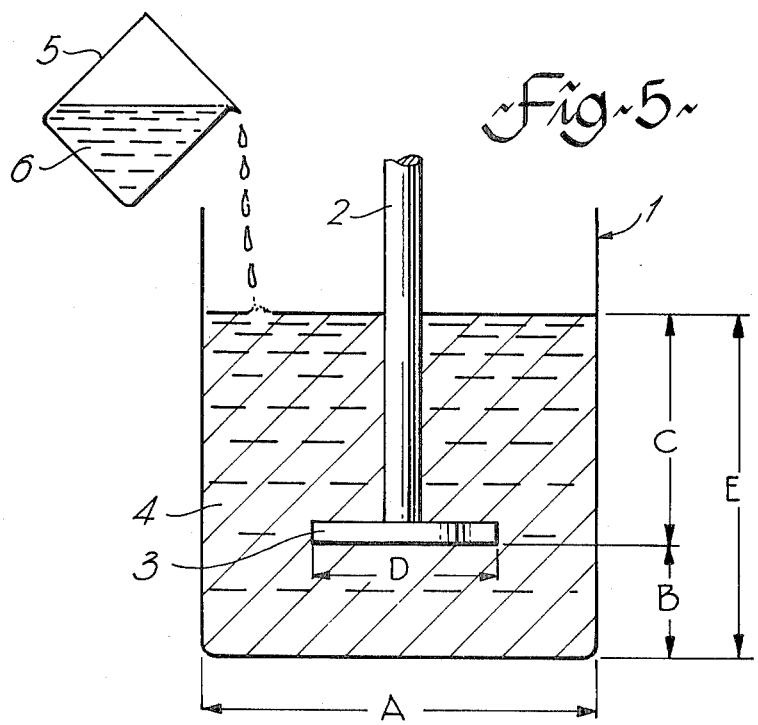

REINFORCED SULPHUR-ASPHALT COMPOSITES OF TWO CONTINUOUS PHASES

This application is a continuation-in-part of our earlier filed U.S. application Ser. No. 729,362 filed Oct. 10, 1976 and now abandoned.

This invention relates to a novel sulfur-bituminous composite binder material and to methods for preparing same. More particularly, it relates to a sulfur-asphalt composite binder material in which the sulfur and asphalt are interspersed throughout the composite as two continuous phases. The two phases cooperate synergistically to provide a composite binder having properties uniquely different from either of the constituent phases. The composite binder of the present invention consists of a porous substantially continuously interconnected skeleton of finely divided sulfur the pores of which are filled with asphalt, tar or pitch, optionally reinforced with a minor proportion of a fibrous or crystalline reinforcing material. The composite binder of the present invention is suitable for such applications as repairing a surface of pavement and in particular filling pot holes, and as a roofing material. The composite binder can be cast, in a semi-liquid state at temperatures of the order of 150° C., into a pot hole or bituminous pavement cavity to provide a good bond with the contact surfaces, resulting in a tough and durable repair.

The use of sulfur in asphaltic-aggregate compositions is well known in the art. In low concentrations, when sulfur to asphalt weight ratios are 1:1 or less, the sulfur acts essentially as a filler. At higher concentrations sulfur adds strength to the mix thereby contributing to the mechanical stability of the resulting pavement. While such high concentration sulfur-asphalt-aggregate mixes have been employed to a limited extent for road building, these mixes are very difficult to compact employing conventional rolling techniques and special techniques must be adopted. In one such technique, described in Canadian Pat. No. 945,416, issued Apr. 16, 1974, to Kopvillem et al, high-sulfur-asphalt-aggregate mixtures are cast at relatively high temperatures. While the sulfur may contribute to the strength, such mixtures depend largely upon the strength of the asphalt to support the aggregate in the mixture, because it is believed that there is still insufficient sulfur in the mixture to form a continuous skeleton of sulfur in the matrix. It is further believed that because the sulfur is normally added in molten form without special mixing steps, there is little likelihood of formation of a relatively hard, crystalline porous sulfur skeleton in the mixture. Applicants have, therefore, developed an alternative composite binder material which has a relatively high strength, good bonding characteristics and which is self-compacting. Applicants have, surprisingly, found that a rigid microporous continuous skeleton or matrix of sulfur surrounded by a continuous bituminous phase, preferably asphalt, exhibits the desired properties and is, in fact, stronger than either a continuous sulfur phase or asphalt phase alone. Applicants have further found that merely mixing liquid sulfur with liquid asphalt, in the appropriate proportions as described in more detail hereinafter, at relatively high temperatures does not result in the continuous porous skeleton of sulfur which is believed essential to the present composite binder. Applicants have found that the desired continuous porous skeleton of sulfur can be produced by mixing liquid sulfur and liquid asphalt, at temperatures in the range 130°–150° C., provided that such mixing is conducted with sufficient shear so as to disperse the liquid sulfur as an emulsion in the liquid asphalt. A continuous porous skeleton of sulfur forms on cooling to room temperature. Applicants have also found that when sufficient finely divided solid particles of sulfur are mixed with a semi-liquid bituminous material, such as asphalt, at a temperature in the range 120°–150° C., that on cooling the desired porous skeleton of sulfur can be produced.

Thus, it is one object of the present invention to provide a novel sulfur-asphalt composite binder material suitable for patching and similar applications. It is another object of this invention to provide methods for making a composite binder having two continuous phases comprising sulfur and a bituminous material.

Thus, by one aspect of this invention there is provided a sulfur-bituminous composite binder material consisting essentially of 60–75% by weight sulfur, 25–40% by weight bituminous material, wherein said sulfur and said bituminous material are interspersed throughout said composite binder as two continuous phases.

By a second aspect of this invention there is provided a method for producing a sulfur-bituminous composite binder material wherein said sulfur and said bituminous material are interspersed throughout said composite binder as two continuous phases, which comprises mixing 60–75% by weight of finely divided solid particles of sulfur with 25–40% by weight of said bituminous material at a temperature in the range 120° C.–150° C. and cooling the resultant composite binder material, thereby producing a microporous continuous crystalline sulfur phase in a continuous viscoelastic bituminous phase.

By yet another aspect of this invention, there is provided a method for producing a sulfur-bituminous composite material wherein said sulfur and said bituminous material are interspersed throughout said composite as two continuous phases, which comprises mixing 60–75% by weight of liquid sulfur with 25–40% by weight of said bituminous material, at a temperature in the range 130°–150° C., with sufficient shear action to effect an emulsion of the liquid sulfur in the bituminous material, cooling the resultant mixture and thereby producing a microporous continuous crystalline sulfur phase in a continuous viscoelastic bituminous phase.

In a preferred embodiment of the invention the composite is further strengthened or reinforced by the inclusion of a relatively small amount (up to about 5% by volume) of a flake and/or fibrous material, such as fibrous organic material. Preferably organic fibres, such as nylon, polypropylene or polyesters are of the order of 0.001" diameter and 0.1" long and are anchored in both phases. Inorganic fibrous or flake materials, such as asbestos, glass fiber or mica flake, may also be employed.

The invention will be described in more detail hereinafter by reference to the examples and drawings in which:

FIG. 3 is a block diagram illustrating hardness of composites of the present invention (FIG. 3a) relative to hardness of composites prepared according to the prior art (FIG. 3b);

Figure 4A:
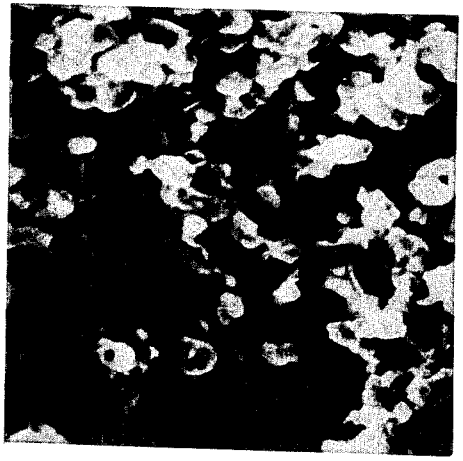
FIG. 4a is a micro-photograph (x 1.2 k) of a composite binder material prepared according to the present invention.
Figure 4B:
FIG. 4b is a micro-photograph (x 1.2 k) of a composite binder material prepared according to the process of French Pat. No. 1,444,629.
Figure 4C:

FIG. 4c is a micro-photograph (x 1.2 k) of a composite binder material prepared according to the process of U.S. Pat. No. 3,970,468 Garrigues; and FIG. 5 is a schematic sketch of a mixing device for use in the present invention.

In carrying out one series of tests of the present invention, the inventors mixed sufficient powdered sulfur with liquid asphalt at 130°–150° C. and the resultant mixture was quenched in air at 20° C., to yield a composite consisting of two continuous phases of sulfur and asphalt. The sulfur/asphalt ratio was found to be at least 1.75–2.00 (approximately 60–75% by weight sulfur, 25–40% by weight asphalt). It was found that at a sulfur-asphalt ratio of about 1.75 the sulfur particles began to form the essential porous network having structural integrity which is an essential characteristic of the invention. At a ratio above 1.75 the sulfur contributed to the strength of the composite and the material characteristics changed from viscoelastic to brittle. At sulfur-/asphalt ratios above about 5.0 there was insufficient asphalt present to maintain a continuous phase thereof and the strength of the composite declined. Preferably the ratio is maintained at 3.0 or below.

In a second series of tests, the inventors mixed liquid sulfur at 150° C. and bitumen at 130°–150° C. in the proportions outlined above, in a high speed shear mixer, such as a Shar Dispersion Equipment mixer which is similar to that used as a dispersion emulsifier in paint manufacture, at a speed in the range 4000–6000 rpm, and preferably 5000 rpm. The temperature of the mixture was controlled at approximately 150° C. during mixing. ½–1 lb. batches were mixed for between 10 and 15 minutes at a relatively slow speed while incorporating the liquid sulfur into the asphalt and the mixture was then mixed at high speed for a further 15–30 minutes.

Similar large scale trials were successful in producing the two continuous phase composite. In these trials 3000 grams of liquid sulfur at 150° C. were slowly added, over an interval of 15 minutes, to 1500 grams bitumen at 130°–150° C. in a mixer as illustrated in FIG. 5. The blade tip speed was controlled between 1500 ft/min and 5000 ft/min. Preferably the blade tip speed was held at 2000 ft/min for 15 minutes and increased to 3,650 ft/min for another 15 min.

The dimensions of the mixing vessel 1 illustrated in FIG. 5 are not critical although it is important to maintain certain ratios between the diameter of the paddle blade 3, the diameter of the vessel 1, the height of the paddle assembly 2, 3 above the bottom and the depth of the liquid asphalt 4.

The preferred ratios are shown in Table I below:

TABLE I

| Dimension | A | B | C | E |
|---|---|---|---|---|
| Standard | 3D | ⅔D | 2D | 3D |
| Min. | 2D | ½D | D | 2D |
| Range Max. | 4D | D | 3D | 4D |

It will be appreciated, however, that other mixing equipment used for producing emulsion or colloidal dispersions such as gear pumps, or colloidal mills could also be used to produce the desired dispersion of liquid sulfur and asphalt.

Direct evidence for the existence of the two continuous phases was provided by scanning electron micrographs of the continuous sulfur phase obtained by leaching out the continuous asphalt phase from the samples having sulfur-asphalt ratio equal 2 (FIG. 4a).

It is stressed however that the correct sulfur-asphalt ratio alone is *not* the *sole* criteria for successfully producing a two continuous phase composite. A homogenous composite with sulfur-asphalt ratio equal 2 can be produced using liquid sulfur and normal stirring; however the sulfur in this composite does not form a network but remains as discrete particles in a continuous asphalt matrix (FIG. 4b). It is believed that special procedures, such as the two described in this application, are necessary for the formation of the required two continuous phases.

The micrographs (FIGS. 4a, 4b and 4c) represent respectively three different sulfur-asphalt preparations which have been subjected to a leaching process to remove the asphalt (in Varsol ®). The three sulfur-asphalt preparations are as follows:

(1) sulfur-asphalt ratio equal 2.0 representative of a sample prepared by high speed shear mixing of liquid sulfur and asphalt at 150° C. as hereinbefore described with reference to this invention. That a similar structure for a composite can be prepared by addition of finely divided solid sulfur will be demonstrated hereinafter by pore size distribution measurements;

(2) sulfur-asphalt ratio equal 2.0 representative of sample prepared by ordinary manual or slow-speed mixing of liquid sulfur and asphalt at 150° C. (As in French Pat. No. 1,444,629);

(3) sulfur-asphalt ratio equal 1.0 prepared by addition of 5 micron sulfur particles to liquid asphalt at 150° C. (As in Garrigues U.S. Pat. No. 3,970,468).

FIG. 4a reveals the porous sulfur network formed in preparation 1 samples. It is apparent that a continuous sulfur network has formed. FIG. 4b is a presentation of a number of *discrete* sulfur particles remaining after asphalt has been leached from preparation 2 samples. It is apparent that a continuous sulfur network has not formed. FIG. 4c is a micrograph of a leached sample of preparation 3. It provides the appearance of a *pile* of sulfur particles which have formed a close-packed array as a result of structural collapse due to leaching of the asphalt phase.

The micrographs reveal sulfur structures which are compatible with the observations reported in the application that the mechanical properties for preparation 1 are significantly higher than those for preparations 2 and 3.

Further evidence that a continuous sulfur matrix had in fact been produced was obtained by extracting the asphalt from several samples made with finely divided sulfur with sulfur/asphalt ratios 1.5–5.0—using Varsol ®. Pore size distributions were determined on the sulfur matrix using a mercury porosimeter and pressures up to 15,000 psi. The results are listed in Table II.

TABLE II

| Pore Size Distribution of Continuous Sulfur Phase | | | |
|---|---|---|---|
| Sulfur Asphalt | Porosity | Pore Size $\mu$m | Remarks |
| 1.5 | 56.0 | 1–15 | 81%, 7–15 $\mu$m (micrometers) |
| 2.0 | 47.5 | 1–15 | 90%, 7–15 $\mu$m |
| 2.5 | 45.0 | 2.5–15 | 90%, 2–10 $\mu$m |

TABLE II-continued

Pore Size Distribution of Continuous Sulfur Phase

| Sulfur Asphalt | Porosity | Pore Size μm | Remarks |
|---|---|---|---|
| 3.0 | 44.0 | 2.5-15 | 96.5%, 2-6 μm |
| 5.0 | 28.5 | 2.5-15 | 93%, 2.5-7 μm |

Physico-Mechanical Properties of Two Continuous Phase Composite Binder

Figure 1:
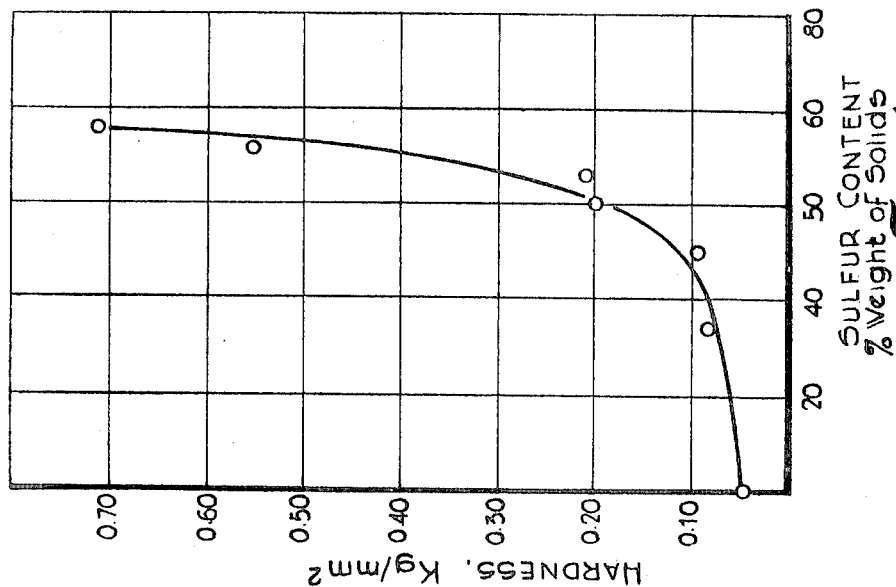
FIG. 1 is a graph illustrating hardness as a function of sulfur content.

Hardness measurements were made using a cone penetrometer. The load produced by air pressure in a piston-cylinder arrangement was applied in steps of 3 lb. and the penetration depth was measured at each level after reaching the equilibrium value. The plot of the load versus the depth of penetration squared generally gives two straight lines with the slope greater for the line at low penetration. The final slope of the graph representing the deeper penetrations includes the major number of measurements and is believed to represent the hardness of the three dimensional structure as shown in FIG. 1. The hardness is calculated on the basis of the applied load per unit area on the circumferential area of the 60° cone according to the following formula $$H_c = \text{load}/2.1 \times h^2$$

$H_c = \text{lb/in}^2$ h = depth of penetration in inches

Hardness was measured on companion samples to those listed in Table II. Results are reported in Table III.

TABLE III

Hardness vs. Porosity of Sulfur Matrix

| Porosity of Sulfur Matrix | Hardness of Sulfur-Asphalt System kg/mm$^2$ |
|---|---|
| 56.0 | 0.20 |
| 47.5 | 0.35 |
| 45.0 | 0.55 |
| 44.0 | 0.80 |
| 28.5 | 2.70 |

Stability of hot emulsion

The stability of the hot emulsion of liquid sulfur and asphalt was investigated. After 24 hours storage of the hot mix, both remelted and freshly mixed, there was no effect on the porous sulfur matrix as determined by extraction of the asphalt from the solidified mix as described hereinabove. The presence of the porous sulfur skeleton with pore sizes similar to that obtained for samples cast immediately after mixing, was confirmed by mercury porosimeter. It is believed, therefore, that for a period of at least 24 hours a hot liquid mix is stable and that a solidified mix can be remelted without affecting the porous sulfur skeleton when solidified again.

Creep vs. time at various loads

Creep strain (expressed as circumferential area of cone penetrometer) at a given time after loading when plotted against sulfur/asphalt ratio shows a discontinuity at sulfur/asphalt ratios between 1.75 and 2.0. It is postulated that for samples with sulfur/asphalt ratios in the region of the discontinuity the discrete sulfur particles begin to form a continuous phase with weak bonding at points of contact.

With further small additions of sulfur creep is dramatically decreased and the area of cone penetration is less than 0.2 mm$^2$.

Hardness vs. Sulfur Content

When hardness is plotted against sulfur content by weight of total solids there is an abrupt change in slope when the sulfur/asphalt ratio exceeds 2.0 indicating that a continuous sulfur phase is contributing stiffness to the composite. It is important to recognize, however, that a sulfur/asphalt ratio of 2 is not the sole criteria to produce a continuous sulfur phase and that even at this ratio a discontinuous sulfur phase can be produced, in which case the hardness of the composite is considerably lower. A comparison of hardness at a sulfur/asphalt ratio of 2 for continuous (upper block diagram) and discontinuous phase (lower block diagram) is illustrated in FIGS. 3a and 3b respectively.

Tensile Tests

Uniaxial tension tests were performed on standard tensile specimens (ASTM D 638) having cross-sectional area of 0.125 in$^2$ and gauge length 2.25 in.

Results of secant modulus of elasticity, and failure strain $\epsilon_f$ are recorded in Table IV.

TABLE IV

Results of Tensile Tests

| | $E_{sec} \times 10^{-4}$ psi | Stress Level, $E_{sec}$, psi | Sulfur | Asphalt | $\epsilon_f \times 10^2$ | $\sigma_f$ psi |
|---|---|---|---|---|---|---|
| | 0.09 | 4 | 0.50 | | >>4.90 | 9 |
| | 0.13 | 8 | 1.25 | | 4.90 | 15 |
| T = 22° C. | 0.39 | 34 | 1.50 | | 4.45 | 57 |
| | 0.57 | 48 | 2.00 | | 4.17 | 90 |
| | 0.83 | 48 | 2.50 | | 3.11 | 96 |
| | 1.44 | 64 | 3.00 | | 2.76 | 144 |
| | 0.43 | 128 | 0.50 | | 4.00 | 148 |
| | 1.00 | 128 | 1.25 | | 2.66 | 148 |
| T = −31° C. | 0.80 | 128 | 1.50 | | 2.56 | 148 |
| | 1.08 | 128 | 1.75 | | 2.44 | 148 |
| | 1.28 | 128 | 2.00 | | 1.50 | 148 |
| | 1.44 | 128 | 2.50 | | 1.10 | 148 |

Results of tensile tests performed on preparation 1 and preparation 2 samples as previously described in FIGS. 4a and 4b clearly show the advantage of having two continuous phases.

The ratio of the secant modulus of elasticity for composite samples, preparation 1, to preparation 2, samples is approximately 3.30. The ratio of the failure strains≈½, i.e. $\epsilon_f^1/\epsilon_f^2 \approx 0.50$.

Bond to Mortar Surface

Mortar briquettes having water/cement=0.50 were prepared according to ASTM C 190-63. The centre portion of the briquette was cut away providing a ¼"×1" space for filling with sulfur-asphalt composite. The sliced briquettes were steamed prior to filling of the centre portion with the sulfur-asphalt mix. Subsequently the briquettes were tested in uniaxial tension. The bond strength was approximately 84 psi with failure occurring in both substrate and the composite material.

Fracture Energy

Work of fracture and hence an estimate of toughness was measured using the Integral Work of Fracture Method according to the procedure of Tattersall and Tappin (J. Mat. Sci. I (1966) p. 296). This procedure cannot be employed when the sulfur/asphalt <1.75 because the material is then viscoelastic.

Data in Table V demonstrates the effect of sulfur/asphalt ratio on toughness.

TABLE V

Fracture Energy of Sulfur-Asphalt Composite

|  | Sulfur/Asphalt | Fracture Energy Ergs/cm$^2$ |
|---|---|---|
| T = 22°C. | 2.0 | 5.58 |
|  | 2.5 | 2.67 |
|  | 3.0 | 2.11 |
|  | 4.0 | 2.28 |

Reinforcement of Two Continuous Phase Composite Binder

In a further series of tests, composite mixtures as above were loaded with 1–1.5% by volume of a fibrous material. It was found that such fibrous material should have a fair degree of extensibility (20–30%), an aspect ratio (l/d) of 100–200, a nominal length of about 0.1 in and a diameter of 0.001 in. Suitable organic fibres include polyester such as Dacron ®, polypropylene, and polyamides such as nylon or Kevlar ®. Inorganic fibres which can be used include asbestos and glass fibre. It has also been found that flake materials such as the mica sold by Laviolette Mining and Metallurgical Corp., Montreal, Canada, which is a mica flake grade of high aspect ratio, is suitable. The flake and fibre reinforcements may be used either alone or in combination and in the case of mica or glass reinforcement coupling agents may be precoated on the flakes or fibres as known in the glass fibre-polymer reinforcing art. It will also be appreciated that additions of a filler material may also be incorporated in conjunction with the reinforcing fibres or flakes; this will be discussed subsequently.

Generally hardness increases linearly with fibre content, e.g. for asbestos fibre hardness increases from 0.04 Kg/mm$^2$ to 0.096 Kg/mm$^2$ for 0 to 20% fibre by weight (26.5 by volume).

Optimum Fibre Content

Figure 2:
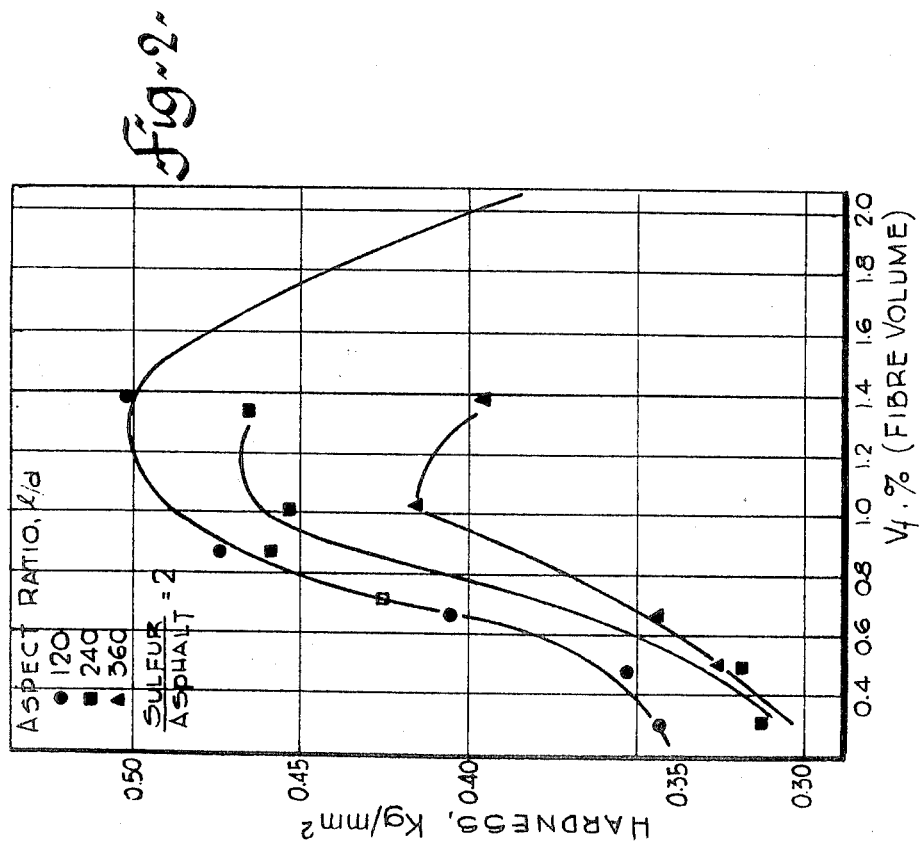
FIG. 2 is a graph illustrating hardness as a function of fibre content (% vol.)

When hardness at 22° C. is plotted against fibre volume, there is an optimum fibre content at approximately 1.33 volume percent (Dacron ® fibre, sulfur/asphalt=2, l/d (aspect ratio=120). For the bell-shaped curves plotting hardness versus volume fraction of fibre the optimum hardness value decreases from 0.55 Kg/mm$^2$ to 0.46 and 0.41 as the aspect ratio l/d goes from 120, 240, 360 as shown in FIG. 2. Adding longer fibres than those corresponding to an aspect ratio of 120 is wasteful of the reinforcing material. For ease of mixing the fibres should be as short as possible (preferably less than 0.25") yet for reinforcement they should be long enough to be embedded in both phases (preferably at least 50 μm). For the latter, the optimum is at 1% by volume.

In Table VI data is presented showing the effect of fibre on the modulus of elasticity for sulfur/asphalt=2.0.

TABLE VI

Effect of Volume Fraction of Fiber on Tensile Properties of Composite

| Volume Fraction of Fiber, $V_f$, % | $E_{sec} \times 10^{-4}$ psi | Stress Level, $E_{sec}$, psi |
|---|---|---|
| 0 | 0.538 | 48 |
| 0.50 | 0.945 | 48 |
| 0.67 | 1.010 | 48 |
| 0.84 | 1.150 | 48 |
| 1.00 | 1.260 | 48 |

$\frac{l}{d} = 120$

It is a particular feature of the present invention that the individual fibres or flakes are firmly anchored in both the sulfur and asphalt phases of the composite, as it is believed that the role of the fibres or flakes is to enhance the toughness of the composite by arresting potential crack propagation as well as providing inclusions with an elastic modulus compatible with the continuous crystalline sulfur phase. The fibres or flakes fill the pores of the sulfur phase and are integrally bonded to both asphalt and sulfur phases. In effect, they reduce the porosity of the sulfur phase. Subsequent to crack formation the fibres contribute to carrying the load as additional stress is transferred to them. The addition of fibres to the composite provides adequate toughness to the composite at temperatures down to about −31° C.

Effect of Fibre Addition at −31° C.

The role of fibres at low temperature is to increase failure strain of the composite, provide toughness and arrest crack propagation due to embrittlement.

Following are results of tensile tests at −31° C. for sulfur/asphalt≃2.0, $V_f$=0.67%.

Effect of Fiber Addition on Tensile Properties at −31° C.

| $V_f$, % | $\epsilon_f \times 10^2$ | $\sigma_f$, psi |
|---|---|---|
| 0 | 1.55 | 160 |
| 0.67 | 5.78 | 160 |

Reduction of Creep

Fibres reduce uniaxial tensile creep by approximately 50%.

TABLE VII

Effect of Fiber Addition on Creep

|  | $V_f$, % | $\epsilon_{creep}$ @ 6 hours ($\sigma$ = 24 psi) |
|---|---|---|
| T = 22° C. | 0 | 14 × 10$^{-3}$ in/in |
|  | 1.33% | 6 × 10$^{-3}$ in/in |

Thermal Expansion

Coefficients of thermal expansion are given in Table VIII for a number of preparations.

TABLE VIII

Coefficient of Thermal Expansion

| l/d = 120 | Sulfur/Asphalt | $V_f$, % | $\alpha \times 10^6$ in/in/°F. |
|---|---|---|---|
|  | 1.25 | — | 65.2 |
|  | 2.0 | — | 73.2 |
|  | 2.0 | 0.34 | 64.5 |
|  | 2.0 | 0.67 | 57.2 |

There is a 22% reduction in coefficient of thermal expansion with fibre addition.

Mica flakes having an aspect ratio (l/d) (in this case average diameter/thickness) between 50 and 200 have also been considered as alternative or complimentary reinforcement for sulfur asphalt composites. Results of tensile tests are presented in Table IX for mica flake composites using mica having average aspect ratio $\approx 80$.

TABLE IX

Tensile Test on Mica-reinforced Sulfur-Asphalt Composite $\dfrac{\text{Sulfur}}{\text{Asphalt}} \approx 2.0$

| $V_f^{mica}$, % | $\epsilon_f \times 10^2$ | $\sigma_f$, psi |
|---|---|---|
| 0.69 | 8.90 | 55 |
| 1.36 | 8.00 | 56 |
| 2.03 | 8.90 | 60 |
| 2.69 | 8.90 | 65.6 |
| 3.34 | 7.55 | 65.6 |
| 3.98 | 7.10 | 60 |

TABLE X

Fracture Toughness of Mica and Fibre Reinforced Sulfur-Asphalt Composite

| Sulfur/Asphalt | $V_f^{Fiber}$ | $V_f^{Mica}$ | Filler % wt. (volume) | T | $\dfrac{1}{d}$ | $\gamma \times 10^{-4}$ ergs/cm² |
|---|---|---|---|---|---|---|
| 2.0 | | | | | | 5.58 |
| 2.5 | | | | 22° C. | | 2.67 |
| 3.0 | | | | | | 2.11 |
| 4.0 | | | | | | 2.28 |
| 2.0 | | | 6.2 | 2.9 | | 3.64 |
| " | | | 11.7 | 5.65 | | 4.15 |
| " | | | 16.7 | 8.26 | 22° C. | 4.91 |
| " | | | 21.0 | 10.70 | | 3.45 |
| " | | | 25.0 | 13.00 | | 3.54 |
| 2.0 | 1.0 | | 6.2 | | 120 | 9.71 |
| " | 1.0 | | 11.7 | 22° C. | | 9.39 |
| " | 1.0 | | 16.7 | | | 10.41 |
| " | 1.0 | | 21.0 | | | 7.47 |
| " | 1.0 | | 25.0 | | | 9.45 |
| 2.0 | | | | −31° C. | | 2.75 |
| " | 0.67 | | | | 120 | 23.69 |
| " | 1.00 | | | | | 45.25 |
| 2.5 | | | | | | 1.16 |
| 3.0 | | | | | | 0.85 |
| 2.0 | 1.0 | | | −31° C. | 240 | 60.0 |
| " | 1.0 | | | | 360 | 48.0 |
| 2.0 | | | 6.2 | | | 1.52 |
| " | | | 11.7 | | | 1.71 |
| " | | | 16.7 | −31° C. | | 2.00 |
| " | | | 21.0 | | | 2.20 |
| " | | | 25.0 | | | 3.00 |
| 2.0 | 1.0 | | 6.2 | −31° C. | 120 | 57.0 |
| " | " | | 11.7 | | | 67.0 |
| " | " | | 16.7 | | | 57.0 |
| " | " | | 21.0 | | | 54.0 |
| " | " | | 25.0 | | | 57.0 |
| 2.0 | | 2.03 | | 22° C. | 80 | 14.36 |
| " | | 2.03 | | −31° C. | 80 | 42.86 |
| " | | .690 | | 22° C. | | 8.25 |
| " | | 3.34 | | 22° C. | | 12.02 |
| 2.0 | 0.34 | | | | | 13.6 |
| " | 0.50 | | | 22° C. | 120 | 13.4 |
| " | 0.67 | | | | | 16.1 |

From the data presented in Table X it is obvious that mica flakes can be used to replace fibres or in conjunction with fibres to give the sulfur asphalt composite toughness at low temperature (−31° C.). For a repair material intended to be used to fill "potholes", toughness is probably the most important parameter to be considered and mica flakes give comparable performance to Dacron ® fibres.

As previously indicated, the composite of the present invention is self-compacting and no special rolling or compacting equipment is required when the composite is used to file potholes and the like. It will be appreciated, however, that the composite is relatively hard and stiff at room temperatures and it is, therefore, necessary to heat the composite to a temperature in the range 100°–150° C. in order to make it workable in the field. A portable heater of any conventional type is necessary for use in field repair work.

While this invention has been described with reference to a two-phase composite which optionally includes a minor proportion of a reinforcing material such as a fibrous of flake material, use of an extender, such as a fine aggregate of sand or crushed stone up to about ⅜" is not precluded, always providing that sufficient sulfur and asphalt are present to ensure the continuity of the two phases thereof. Aggregates up to about 70% by vol. may be employed without loss of continuity.

Addition of Fillers or Aggregates To the Reinforced Two Continuous Phase Composite The addition of fillers or aggregates to the composite may be desirable to decrease shrinkage on cooling, e.g. silica sand assists in reducing shrinkage.

Effect of Fine Filler Additions

The effect of fine filler additions (up to say ⅜"), such as ground silica or other fillers conventionally used with asphaltic or cementitious binders, to sulfur-asphalt composite is to increase the hardness in direct relation to filler content by weight, e.g. for sulfur/asphalt = 2.0 hardness increases from 0.20 Kg/mm² with 0% filler addition to 1.31 Kg/mm² at 44% filler addition.

Table XI gives details of tensile tests performed on composite (sulfur/asphalt = 2.0) containing varying proportions of filler additive. Preferably, filler having a particle size to pass 200 Tyler mesh with not more than 10% retained on 325 mesh, is employed.

TABLE XI

| | Filler % by wt. | $E_{sec} \times 10^{-4}$ psi | Stress Level, $E_{sec}$, psi | $\sigma_f$ psi |
|---|---|---|---|---|
| | 0 | 0.52 | 48 | 90 |
| | 6.2 | 0.88 | 48 | 92 |
| | 11.7 | 0.60 | 48 | 64 |
| T = 22° C. | 16.7 | 0.88 | 48 | 94.5 |
| | 21.1 | 1.26 | 56 | 112.0 |
| | 25.0 | 1.04 | 48 | 72 |

In general the effect of filler addition is to increase the modulus of elasticity and microhardness. The failure stress $\theta_f$ is not much affected.

Somewhat coarser aggregate materials, such as limestone or quartz chips and the like (up to about 1" diameter) which are conventional aggregates used with cementitious or asphaltic binders may also be added for certain applications.

We claim:

1. A sulfur-bituminous composite binder material consisting essentially of above 60% and up to 75% by weight sulfur and from 25% to below 40% by weight bituminous material, wherein a rigid microporous continuous skeleton of sulfur is surrounded by a continuous bituminous phase and wherein said bituminous material is selected from asphalt, tar and pitch.

2. A composite binder material as claimed in claim 1 wherein said bituminous material has a softening point range between about 100° C. and 200° C.

3. A composite material comprising a binder material as claimed in claim 1 and including up to about 25% by weight of a filler material having a particle size in the range $-\frac{3}{8}''$ to +325 mesh.

4. A composite material comprising a binder material as claimed in claim 1 and including up to about 5% by volume of a reinforcing material selected from the group comprising mica, fibrous organic materials, asbestos, glass-fibre and mixtures thereof.

5. A composite material as claimed in claim 4 wherein said reinforcing material is mica having an aspect ratio (average diameter/thickness) of about 50 to 200.

6. A composite material as claimed in claim 4 wherein said fibrous organic material is selected from the group comprising polyester, polypropylene and polyamides.

7. A composite material as claimed in claim 6 wherein said fibrous organic materials have an aspect ratio (l/d) of 100 to 200.

8. A composite binder material as claimed in claim 1, wherein said continuous sulfur phase is a microporous phase having a pore size range of 5–15μ.

9. A method for producing a sulfur-bituminous composite binder material wherein said sulfur and said bituminous material are interspersed throughout said composite as two continuous phases which comprises mixing finely divided solid particles of sulfur of about 5 microns with a semi-liquid bituminous material selected from asphalt, tar and pitch at a temperature in the range 120° C.–150° C. in proportions of above 60% and up to 75% by weight sulfur and from 25% to below 40% by weight of said bituminous material, and cooling the resultant composite binder material, thereby producing a microporous continuous crystalline sulfur phase in a continuous viscoelastic bituminous phase.

10. A method as claimed in claim 9 including mixing up to about 5% by volume of a reinforcing material having an aspect ratio (l/d) in the range 50 to 200 with said finely divided sulfur particles and said bituminous material.

11. A method as claimed in claim 10 wherein said finely divided sulfur particles have a particle size of less than about 10 μm.

12. A method as claimed in claim 10 including mixing up to about 25% by weight of a filler material having a size range between $-\frac{3}{8}''$ and +325 mesh, with said finely divided particles of sulfur and said bituminous material.

13. A method for producing a sulfur bituminous composite binder material wherein said sulfur and said bituminous material are interspersed throughout said composite as two continuous phases, which comprises mixing liquid sulfur with a liquid bituminous material selected from asphalt, tar and pitch, at a temperature in the range 130°–150° C., with sufficient shear action to produce an emulsion of liquid sulfur in said bituminous material in proportion of above 60% and up to 75% by weight sulfur and 25% to below 40% by weight bituminous material, cooling the resultant mixture and thereby producing a microporous continuous crystalline sulfur phase in a continuous viscoelastic bituminous phase.

14. A method as claimed in claim 13 wherein said shear action is achieved by mixing in a high speed shear mixer operating with a blade tip speed in the range 1500 to 5000 ft/min.

15. A method as claimed in claim 14 wherein said liquid sulfur is slowly added, at about 150° C. over a period of about 15 minutes, to said bituminous material at 130°–150° C., and wherein said blade tip speed is about 2000 ft/min for about 15 minutes and about 3650 ft/min for a further period of about 15 minutes.

16. A method as claimed in claim 14 including mixing up to about 5% by volume of a reinforcing material having an aspect ratio (l/d) in the range 50 to 200 with said sulfur and said bituminous material.

17. A method as claimed in claim 14 including mixing up to about 25% by weight of a filler material having a size range between $-\frac{3}{8}''$ and +325 mesh with said sulfur and said bituminous material.

* * * * *